May 30, 1944.  E. P. DRAKE ET AL  2,350,020
METERING AND CONVEYING SYSTEM
Filed May 3, 1941  2 Sheets-Sheet 1

Inventor
EDWARD P. DRAKE,
FRED J. ALBERTY,
WILLIAM H. KAGLEY,

Attorney

May 30, 1944.   E. P. DRAKE ET AL   2,350,020
METERING AND CONVEYING SYSTEM
Filed May 3, 1941   2 Sheets-Sheet 2
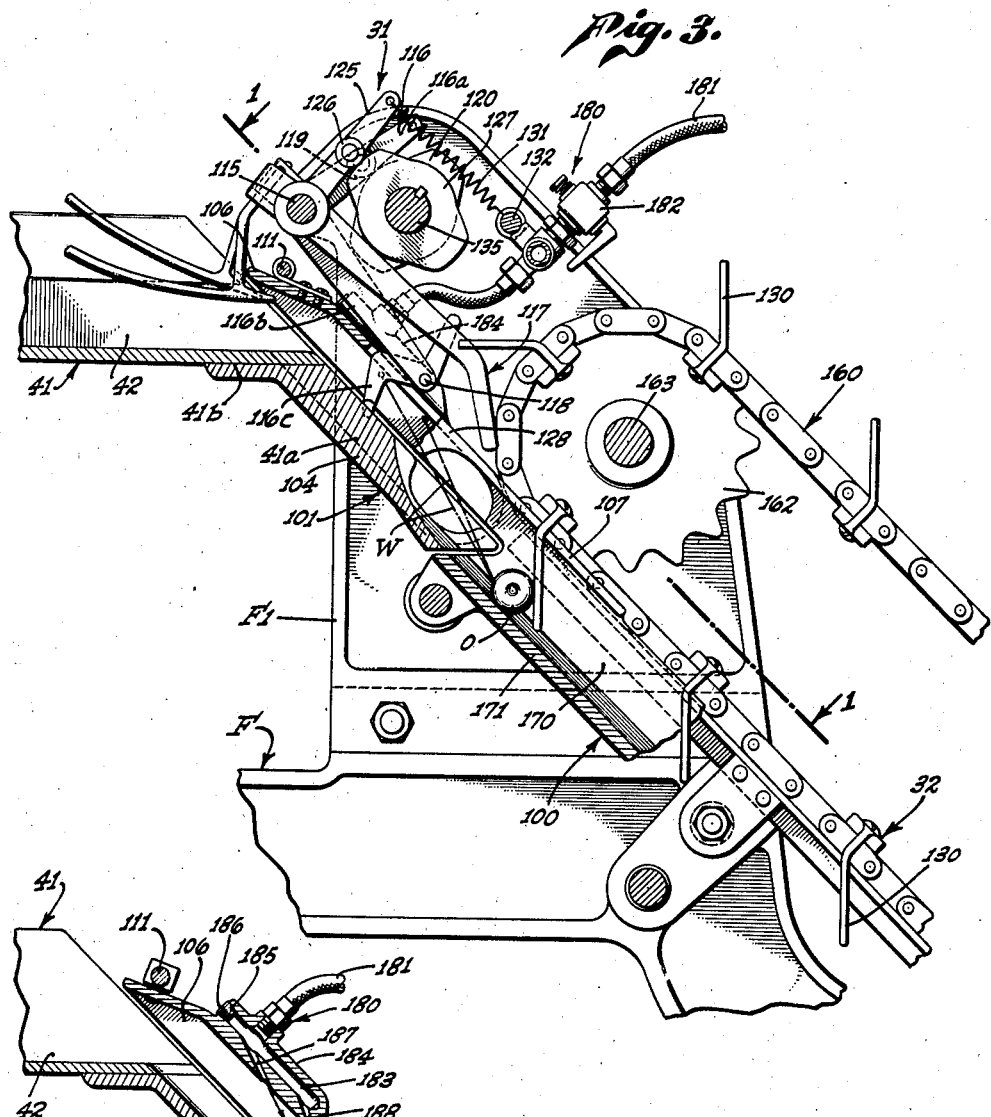
Fig. 3.
Fig. 4.
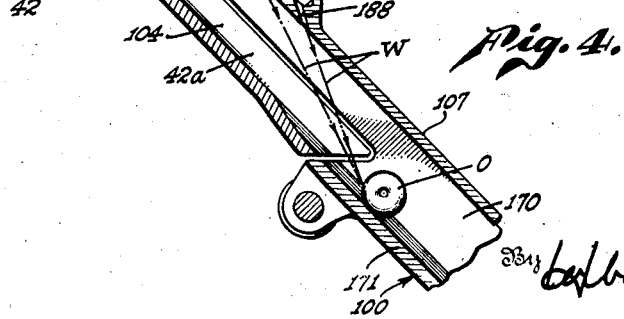
Inventor
EDWARD P. DRAKE,
FRED J. ALBERTY,
WILLIAM H. KAGLEY,
Attorney Patented May 30, 1944

2,350,020

UNITED STATES PATENT OFFICE 2,350,020

METERING AND CONVEYING SYSTEM

Edward P. Drake and Fred J. Alberty, Los Angeles, and William Herbert Kagley, Lindsay, Calif., assignors to Lindsay Ripe Olive Company, Lindsay, Calif., a corporation Application May 3, 1941, Serial No. 391,744

11 Claims. (Cl. 198—26)

This application is for improvements over the invention disclosed and claimed in Patent No. 2,205,397, granted June 25, 1940, for Automatic pitting machine, and also of the copending application of Edward P. Drake, Serial No. 245,431, filed December 13, 1938, for Automatic olive pitting machine, and is a continuation in part of the copending application of Edward P. Drake, Fred J. Alberty, and William Herbert Kagley, Serial No. 322,540, filed March 6, 1940, under the title Automatic machine for pitting fruit, re-entitled Metering and aligning machine.

This invention relates primarily to the fruit packing industry and to a metering and conveying system for metering and conveying fruit in connection with a mechanism to perform operations thereon, such for example as olives, in preparation for packing them in jars or cans. Our system is adaptable for handling various kinds of fruit and other articles and by our reference to olives as an illustration of its use we do not intend to limit the invention in any way. It will be apparent as the description progresses that certain features of our system have their greatest utility in the handling of olives because of the oblong character of that fruit, but it will also be observed that the same system may be employed for handling cherries, plums, apricots, and various other fruits and for metering and conveying other articles. For convenience, however, in description and to bring out all the features of novelty and utility we will describe the system in connection with the handling of olives and particularly with reference to an automatic olive pitting machine.

Our present metering and conveyor system is intended primarily for use with or as a part of a machine adapted to handle a continuous supply of olives which may be from boxes or any other bulk delivered into a hopper, to transfer from the hopper a continuous flow of olives to a metering and conveying device which spaces their subsequent travel, and to position the olives in the region of a die and punch mechanism.

An object of the present invention is to provide water jets to accelerate the travel of olives in the metering and conveyor system.

A further object is to provide water jets in a metering and conveyor system for accelerating the travel of olives from a plurality of troughs or passages into a single trough or passage for further handling.

A further object is to provide in a metering and conveyor system of the character described water jets adapted to play against olives which are temporarily held behind metering and spacing fingers whereby when the olives are released by such fingers they are immediately impelled by the force of the water to move on beyond such fingers.

A still further object is to provide in a device of the character described water jets adapted to direct water under pressure against the olives in such a position as to cause any olives which are on end to immediately topple into a position with their longitudinal axes horizontal to facilitate alignment of the olives in subsequent travel.

Other objects and advantages will appear from the further description in the specification.

In the drawings:

Figure 3 is a vertical section taken on the line 3—3 of Figure 1.

Figure 4 is a fragmentary vertical section taken on the line 4—4 of Figure 1, with certain of the operating parts omitted to more clearly illustrate the water jets.

Figure 1:
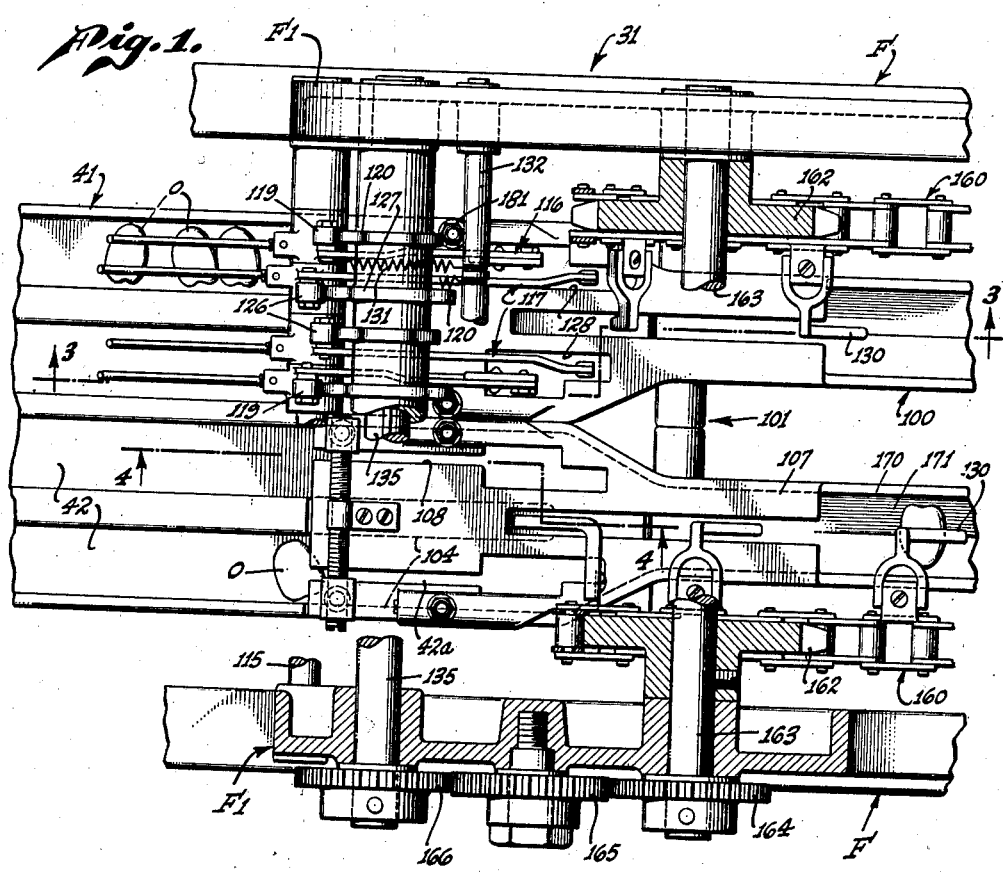
Figure 1 is a section of our metering and conveying system, taken on line 1—1 of Fig. 3.

Referring to the drawings, we provide a tray 41 preferably mounted in a manner to permit it to vibrate, and coupled with vibratory means, not shown. In the form illustrated this tray includes four olive passages 42, through which olives 0 are caused to travel by the vibration of the tray or by inclination thereof, toward a metering device 31.

The purpose of this metering device is to receive the olives from the four delivery passages, space their subsequent travel and divert them into two inclined positioning chutes or troughs 100 which are part of a spacing and positioning mechanism 32. It has been found that four of the delivery passages are advisable to assure a continuous supply of olives to two positioning chutes. Preliminary to describing the mechanism for spacing the subsequent travel of the olives after leaving the vibrating tray it is preferable to describe a subordinate part of the metering mechanism or device through which the olives travel as they are metered and where they are diverted from the four channels or passages described into the two inclined chutes. This subordinate part of the metering device is termed a magazine numbered 101. It comprises in part a downwardly, steeply inclined extension 41a of the vibrating tray 41 in which there are walls 104 forming four olive passages 42a which are extensions of the passages 42 in the vibrating tray 41.

The extension 41a is preferably welded at 41b to the lower face of the vibrating tray at the forward end thereof and forms the lower part of the magazine 101. Its walls 104 rise slightly less than half of the total height of the olive passages in the magazine 101. The upper wall boundaries of the olive passages in the magazine are provided by extension walls 106 of the olive chutes 100. These extensions 106 are rigidly fixed to a cover 107, which is formed of one piece longitudinally slotted as at 108 to afford lateral adjustment at the upper end for the purpose of regulating the width of the magazine passages. The material of the cover is sufficiently resilient to be sprung under action of a screw 111.

Each adjacent pair of the olive passages 42a in the magazine merges into a single open passage in the olive chutes, the latter being subsequently described in more detail.

There is preferably no physical connection between the lower extension 41a of the vibrating tray which make up the lower part of the magazine, and the overlying extensions 106 of the olive chutes and the cover 107 which comprise the upper part of the magazine, there being preferably a continuous vibration of the extension 41a when the machine is in operation while the upper part of the magazine remains stationary. The latter is supported on an extension F1 of a main frame F. The bottom of the passages 42a are in alignment with the troughs or channels of the olive chutes 100 but as is evident are slightly separated therefrom. Diversion of the olives from the four passages of the vibrating tray extension 41a to the two passages in the olive chutes occurs in the region of the junction between the vibrating extension 41a and the upper end or terminus of the troughs or channels of the olive chutes 100.

The metering device has four similar units, one to serve each delivery passage 42a, a complete description of one of which units will suffice.

Mounted on the extension F1 of the frame is a stationary shaft 115. Journaled to rock on this shaft is a retaining finger 116 and a cooperating holding finger 117. The finger 116 is in the form of a crank having arms 116a and 116b. On the arm 116b is a tip 116c. The tip 116c is in the form of a Z which is mounted at the end of the arm 116b by means of a bolt or pin 118. The tip 116c may be adjustably positioned for olives of different sizes and for different working conditions by loosening the bolt 118, rotating the tip 116 to the desired position, and re-tightening the bolt. The arm 116a is provided with a roller 119 which makes contact with a cam 120. The tip 116c engages the olives in turn as they enter the passage 42a of the magazine 101, permitting them to enter one at a time into the space between the tip 116c and the holding finger 117. The rise and fall of the tip 116c, effected by action of the cam 120, secures this function. The tip 116c should be so adjusted that there is room for only one olive between the tip 116c and the finger 117. After an olive has been allowed to pass tip 116c it lodges momentarily against the finger 117. This finger 117 is also in the form of a crank provided with an arm 125 which has a roller 126 bearing on a cam 127, which causes a rise and fall of the finger 117 alternating with the rise and fall of the tip 116c.

The action of the tip 116c and the finger 117 occurs through an enlarged extension 128 of the slot 108 in the cover 107.

There being an olive lodged against finger 117, the timing of the cams is such that when tip 116c falls into the position shown in Figure 3, finger 117 rises into the position also shown in Figure 3. An olive moving into the passage 42a is thus retained there while the olive momentarily lodged against finger 117 is released and rolls downwardly by gravity and under the influence of the water jet more particularly hereinafter described, and is simultaneously diverted into the chute 100 where it is caught by a spacer 130, the details of which are not a part of the invention claimed in the present application.

This action of the retaining finger 116 and the holding finger 117 prevents more than one olive at a time passing the finger 117, which is important to the subsequent handling of the olives.

Springs 131 yieldably urge the retaining finger 116 and the holding finger 117 against the respective cams 119 and 120. The springs are anchored at one end to a rod 132 which is mounted on the frame extension F1.

The cams are keyed to a shaft 135 which is journaled in the frame extension F1. Each cam is designed with two raised portions, thus causing the finger it actuates to rise and fall twice with each revolution. The raised portions of the cam 120 are offset 90° from those of the cams 127, the cams being secured to the shaft 135 in pairs for the cooperative action of a unit consisting of a retaining finger 116 and a holding finger 117. The shaft 135 is driven by means to be subsequently described. The timing provides alternate releasing of olives from adjacent passages 42a into the chutes 100 at a rate to deposit one olive upon each spacer 130 as the spacer passes.

Shaft 135 and consequently cams 120 and 127 are driven by the following means: An electric motor, not shown, or any other power source is used to drive an endless chain 160 which in turn rotates a sprocket 162 fixed to a shaft 163 journaled in the frame extension F1. At one end of the shaft 163 is a gear 164 which meshes with an intermediate gear 165 and this in turn meshes with a gear 166 keyed to the cam shaft 135.

The chutes 100 each comprise a trough having vertical side walls 170 and a bottom 171 U shaped in cross section near the upper end. The width of the trough is slightly greater than the length of the largest olives to be pitted.

Supported on the rod 132, which is located in the region of the metering mechanism, are fluid supply devices 180. Each comprises a hose 181, a valve 182, and a chamber 183. We provide such a device over each passage 42a.

The chamber 183 is formed by the cover 107 of the magazine, and a housing 184 which may be conveniently tapped and threaded at 185 to provide for a plug 186 which can be removed for clean-out purposes.

Figure 2:
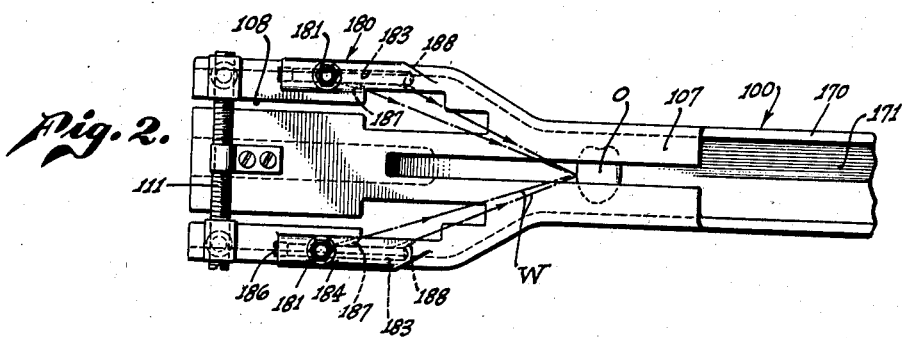
Figure 2 is a fragmentary top plan view of one of the units in the metering and conveying system showing a pair of troughs merging into a single trough and further illustrating the direction of the water jets.

The lower part of the chamber is provided with one or more small passages such as shown at 187 and 188 which may, if desired, be tapered. In the form illustrated I have shown two such passages. The axes of these passages are directed to cause streams of water or brine or other fluid indicated by the letter W to converge as illustrated, at a point which is central of the chute 100 and at or near the bottom of the chute. The requirement thus is for the passages 187 and 188 to be angled inwardly and downwardly; and the four passages of two complementary devices are so arranged as to cause all four streams of water or brine to converge at one point as illustrated in Figures 2 and 4.

Water or brine under pressure from any suitable source is supplied through the hose 181 and is delivered in the form of jets or sprays through the nozzle passages 187 and 188. There is thus provided a continuous hydraulic stream against the olives which are intermittently passing through the metering mechanism, and which stream impels each olive on its way as the holding finger 117 is elevated. These streams are played upon the olives in such a position as to cause any olive which happens to be standing on end to be immediately toppled into a horizontal position, and as the jets are playing upon the olives from above with a downwardly and inwardly directed path, the streams themselves tend to roll the olives barrel-like down the trough toward the spacing fingers 130. Other important functions of these hydraulic streams are to provide lubrication in the magazine passages and the chutes 100 and to forcibly propel the olives from opposite passages 42 into the single chute 100. While the action of the olives in rolling down through the inclined ends of the passages 42a and being diverted into the chutes 100 will occur by gravity, we have found that the use of hydraulic streams by the means and in the manner described vastly speeds up the desired movement of the olives through the magazine and into the chutes behind the positioning or spacing fingers 130, and the disposition of the olives with their longitudinal axes in a horizontal plane. This speeding up has enabled us to step up the production rate of the entire olive pitting machine as illustrated and described in our patent referred to, and has materially contributed to the efficiency of the machine.

Although we have herein shown and described our invention in what we have conceived to be the most practical and preferred embodiment, it is recognized that departures may be made therefrom within the scope of our invention, which is not to be limited to the details disclosed herein but is to be accorded the full scope of the claims so as to embrace any and all equivalent structures and methods. Thus, the particular form of fluid manifolds, and nozzles, may be varied within the scope of our invention. Moreover, the essence of the invention resides in the fluid propelling means in relation to the conveyor trough or passages and chutes, irrespective of the details of other mechanism such as the metering fingers. By the term fluid, we mean to include air, steam or other gases, as well as liquids, as broadly as the word is commonly defined, depending upon the particular use to which the mechanism is put. Our reference to water or brine is by way of example only.

Having described our invention what we claim as new and desire to secure by Letters Patent is:

1. In a fruit pitting apparatus the combination of: mechanisms adapted to receive fruit from bulk and deliver individual pieces thereof at regularly spaced intervals for further treatment comprising a plurality of substantially adjacent fruit passages merging into a single fruit passage, and means for accelerating the movement of fruit from the plurality of passages into the single passage comprising fluid nozzles in the first named fruit passages adapted to direct jets of fluid under pressure against fruit passing therethrough substantially in the direction taken by the fruit in passing from the first named passages into the single passage.

2. In an apparatus for conveying rollable articles, a plurality of passages merging into a single passage, and means for accelerating the movement of articles from the plurality of passages into the single passage comprising fluid nozzles in the first named passages adapted to direct jets of fluid under pressure against articles passing therethrough substantially in the direction to be taken by the articles in passing from the first named passages into the single passage.

3. In an apparatus for conveying rollable articles, a plurality of inclined passages merging into a single passage, and means for accelerating the gravity movement of articles from the plurality of passages into the single passage comprising fluid nozzles in the first named passages adapted to direct jets of fluid under pressure against articles passing therethrough substantially in the direction to be taken by the articles in passing from the first named passages into the single passage.

4. In an apparatus for conveying oblong rollable articles, a plurality of passages merging into a single passage, and means for accelerating the movement of articles from the plurality of passages into the single passage and for toppling any articles on end into prone position comprising fluid nozzles in the first named passages adapted to direct jets of fluid under pressure against the upper part of said articles passing therethrough substantially in the direction to be taken by the articles in passing from the first named passages into the single passage.

5. In an apparatus for metering and conveying rollable articles, a plurality of passages merging into a single passage, an intermittently operating holding finger in each of said first named passages for alternately holding and releasing individual articles, fluid nozzles in the first named passages adapted to direct jets of fluid under pressure against said article while the same is lodged against the holding finger to accelerate movement of said article past the holding finger when the latter releases the article, and means to supply fluid under pressure to said nozzles.

6. In an apparatus for metering and conveying rollable articles, a plurality of inclined passages merging into a single passage, an intermittently operating holding finger in each of said first named passages for alternately holding and releasing individual articles to roll by gravity, fluid nozzles in the first named passages adapted to direct jets of fluid under pressure against said article while the same is lodged against the holding finger to accelerate movement of said article past the holding finger when the latter releases the article, and means to supply fluid under pressure to said nozzles.

7. In an apparatus for conveying rollable articles, a plurality of passages merging into a single passage, and means for accelerating the movement of articles from the plurality of passages into the single passage comprising fluid nozzles in the first named passages adapted to direct jets of fluid under pressure against articles passing therethrough substantially in the direction to be taken by the articles in passing from the first named passages into the single passage and downwardly toward the lower part of said single passage.

8. In an apparatus for metering and conveying rollable articles, a conveyor passage, an intermittently operating holding finger in said passage for alternately holding and releasing individual articles, a fluid nozzle in the passage and means associated with the nozzle adapted to direct a continuous jet of fluid under pressure against each article while the same is lodged against the holding finger substantially in the direction to be taken by the article in its further travel to impel movement of the article past the holding finger when the latter releases the article.

9. An apparatus for conveying rollable articles, comprising, a plurality of passages merging into a single passage, and means for accelerating the movement of articles from the plurality of passages into the single passage comprising a fluid nozzle in each of the first named passages adapted to direct a jet of fluid under pressure against articles passing therethrough substantially in the direction to be taken by the articles in passing from the first named passages into the single passage.

10. In an apparatus for conveying oblong rollable articles, a passage comprising a trough formed with a floor over which said articles may roll, means to deliver articles into said passage, and means for accelerating the movement of articles along said passage and for toppling any articles on end into prone position comprising a fluid nozzle communicating with said passage and positioned to direct a jet of fluid under pressure into said passage initially above the floor at a height sufficient for the jet to first encounter said articles above the medial vertical point of the surface thereof.

11. In an apparatus for conveying oblong rollable articles, a passage comprising a trough formed with a floor over which said articles may roll, means to deliver articles into said passage, and means for accelerating the movement of articles along said passage and for toppling any articles on end into prone position comprising a fluid nozzle communicating with said passage and positioned to direct a jet of fluid under pressure into said passage initially above the floor at a height sufficient for the jet to first encounter said articles above the medial vertical point of the surface thereof, and said jet being directed substantially in the direction to be taken by the articles in their travel through said passage and diagonally downward toward the floor of said passage.

EDWARD P. DRAKE.
FRED J. ALBERTY.
WILLIAM HERBERT KAGLEY.